United States Patent
Mohamadi et al.

(10) Patent No.: US 8,237,604 B2
(45) Date of Patent: Aug. 7, 2012

(54) VIRTUAL BEAM FORMING IN ULTRA WIDEBAND SYSTEMS

(75) Inventors: Farrokh Mohamadi, Irvine, CA (US); Mohsen Zolghadri, Newport Beach, CA (US)

(73) Assignee: Tialinx, Inc., Newport Beach, CA (US)

( * ) Notice: Subject to any disclaimer, the term of this patent is extended or adjusted under 35 U.S.C. 154(b) by 230 days.

(21) Appl. No.: 12/718,896

(22) Filed: Mar. 5, 2010

(65) Prior Publication Data

US 2010/0225520 A1 Sep. 9, 2010

Related U.S. Application Data

(60) Provisional application No. 61/158,301, filed on Mar. 6, 2009.

(51) Int. Cl.
*G01S 13/00* (2006.01)
(52) U.S. Cl. .......................................... 342/22; 342/200
(58) Field of Classification Search ................ 342/22, 342/175, 200
See application file for complete search history.

(56) References Cited

U.S. PATENT DOCUMENTS

| | | | | |
|---|---|---|---|---|
| 4,825,215 A | * | 4/1989 | Wiley | 342/351 |
| 5,059,927 A | * | 10/1991 | Cohen | 331/77 |
| 5,121,124 A | * | 6/1992 | Spivey et al. | 342/179 |
| 5,365,237 A | * | 11/1994 | Johnson et al. | 342/179 |
| 5,446,461 A | * | 8/1995 | Frazier | 342/22 |
| 6,680,698 B2 | * | 1/2004 | Eiges | 342/373 |
| 6,707,419 B2 | * | 3/2004 | Woodington et al. | 342/200 |
| 6,937,182 B2 | * | 8/2005 | Lovberg et al. | 342/22 |
| 7,019,682 B1 | * | 3/2006 | Louberg et al. | 342/22 |
| 7,119,621 B2 | * | 10/2006 | Chen et al. | 330/295 |
| 7,209,523 B1 | * | 4/2007 | Larrick et al. | 375/295 |
| 7,224,944 B2 | * | 5/2007 | McEwan | 455/86 |
| 7,239,262 B2 | * | 7/2007 | Osepchuk | 342/22 |
| 7,369,598 B2 | * | 5/2008 | Fontana et al. | 375/130 |
| 7,460,055 B2 | * | 12/2008 | Nishijima et al. | 342/70 |
| 7,592,943 B2 | * | 9/2009 | Beasley | 342/27 |
| 7,609,199 B2 | * | 10/2009 | Nishijima et al. | 342/175 |
| 7,642,929 B1 | * | 1/2010 | Pinkus et al. | 340/973 |
| 7,692,571 B2 | * | 4/2010 | Lovberg et al. | 342/52 |
| 7,773,028 B2 | * | 8/2010 | Chan et al. | 342/137 |
| 7,783,199 B2 | * | 8/2010 | Ridgway et al. | 398/115 |
| 7,812,760 B2 | * | 10/2010 | Teshirogi et al. | 342/135 |
| 8,018,374 B2 | * | 9/2011 | Imai et al. | 342/135 |
| 2002/0171585 A1 | * | 11/2002 | Eiges | 342/373 |
| 2003/0022694 A1 | * | 1/2003 | Olsen et al. | 455/562 |
| 2006/0039449 A1 | * | 2/2006 | Fontana et al. | 375/130 |
| 2010/0001900 A1 | * | 1/2010 | Imai et al. | 342/195 |

* cited by examiner

*Primary Examiner* — Jack W Keith
*Assistant Examiner* — Peter Bythrow
(74) *Attorney, Agent, or Firm* — Haynes and Boone, LLP

(57) ABSTRACT

Systems and methods include up-converting a UWB frequency pulse from a UWB radar unit to a V band frequency pulse; transmitting the V band frequency pulse via an active array antenna; receiving a V band echo pulse via the active array antenna; down-converting the V band echo pulse from the active array antenna to a UWB pulse; and feeding the UWB pulse to the UWB radar unit for processing by the UWB radar unit. A V band antenna system includes: an antenna board that defines an antenna plane being the plane of the board and comprising a plurality of antenna elements; a mother board providing a corporate combining feed to the antenna board; and a power management board to which the antenna board and mother board are mounted perpendicularly to the antenna plane, wherein the antenna elements provide a beam forming antenna for ultra wide band pulses at V band frequencies.

11 Claims, 6 Drawing Sheets

VIRTUAL BEAM FORMING IN ULTRA WIDEBAND SYSTEMS

CROSS REFERENCE TO RELATED APPLICATIONS

This application claims the benefit of U.S. Provisional Application No. 61/158,301, filed Mar. 6, 2009, which is hereby incorporated by reference.

BACKGROUND

The present disclosure generally relates to radio frequency (RF) detection and ranging and, more particularly, to miniaturization of handheld radar units to make them more practical for particular types of use.

Portable, handheld radars have been used for detection of hidden objects, e.g., objects such as weapons or people hidden behind a wall of a building. it may be desirable to be able to detect hidden objects in many situations, including for example, constitutionally supported government agency investigation of a premises containing buildings of unknown internal configuration, military intelligence scenarios, and fire and rescue situations. Ultra wideband (UWB) radar systems have shown a high degree of fitness for such types of use.

UWB impulse radar systems utilize pulse widths on the order of hundreds of picoseconds (trillionth of a second). Because such short pulses necessarily have very few cycles or even a single cycle of RF signal (such as a Gaussian monopulse), UWB radars may be considered to operate in the time domain as opposed to conventional frequency domain processing of received pulses. This time domain operation enables UWB radars to enjoy very fine range resolutions such as on the order of a fraction of a few feet or less. In addition, UWB radars have high power efficiency because of their low transmit duty cycle. Furthermore, UWB radars provide users with a very low probability of detection because their transmitted pulses occupy a relatively large bandwidth and thus have low power spectral density.

Some UWB impulse systems having a 5 GHz center frequency of the RF signal, even though being capable of handheld operation, have an antenna that may be larger and more bulky than desirable for effective use in some situations. Typical systems have focused on narrow band solutions (in contrast to ultra wideband) at higher frequencies. The same principle is applicable to UWB communication systems. As with radar systems, a virtual beam forming mechanism could be applied to omni-directional communication protocols and transform the communication system into a narrow beam width line of sight millimeter wave communication system. Again, the benefit of using virtual beam forming instead of actual physical beam forming would be the size of the antenna system and the fact that in lower RF frequencies where most of the omni-directional wireless systems are working—such as wireless USB or UWB wireless PAN (personal area networks) networks—actual beam forming is not practical or desirable. As can be inferred from the foregoing, there is a need to provide a handheld UWB radar unit using existing 5 GHz UWB radars and having a reduced antenna size not practical with a 5 GHz RF center frequency.

SUMMARY

According to one embodiment, a system includes: a radar unit having a center frequency in the UWB (ultra wide band) radar band; a transmit module connected to a radar impulse output of the UWB radar unit, the transmit module producing V band frequencies that are up-converted from the UWB input from the radar unit; an active array antenna connected to the transmit module; and a receive module connected to the active array antenna to produce UWB frequencies that are down-converted from the V band input from the active array antenna, and a receive input of the UWB radar unit connected to the receive module.

According to another embodiment, a method includes: up-converting a UWB frequency pulse from a UWB radar unit to a V band frequency pulse; transmitting the V band frequency pulse via an active array antenna; receiving a V band echo pulse via the active array antenna; down-converting the V band echo pulse from the active array antenna to a UWB pulse; and feeding the UWB pulse to the UWB radar unit for processing by the UWB radar unit.

According to another embodiment, a device includes: an antenna board that defines an antenna plane being the plane of the board and comprising a plurality of antenna elements; a mother board providing a corporate combining feed to the antenna board; and a power management board to which the antenna board and mother board are mounted perpendicularly to the antenna plane, wherein the antenna elements provide a beam forming antenna for ultra wide band pulses at V band frequencies.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments and their advantages are best understood by referring to the detailed description that follows. Like reference numerals are used to identify like elements illustrated in one or more of the figures.

DETAILED DESCRIPTION

In accordance with one or more embodiments of the present invention, systems and methods disclosed herein provide compact, handheld radar detection of objects using RF pulses in the V band (approximately 50-75 GHz) produced from a radar unit operating in UWB band (approximately 1.6-10.5 GHz) and having a small, active array antenna whose size would ordinarily be too small for use at UWB band and which can take advantage of the higher frequencies of V band for improved beam forming and directionality of the radar pulses. In one particular embodiment, a V band radar system may use an existing commercially available UWB radar at 5 GHz connected to transmit and receive V band modules in a super-heterodyne configuration that converts the UWB radar to V band and uses a compactly sized active array antenna to provide enhanced antenna directionality and beam forming.

A portable radar system such as just described may be useful for dynamically scanning for objects (e.g., ordnance or vehicles) behind a wall, both from moving vehicles, on-road and off-road, and from the ground, and to statically locate internal structural details of buildings or other structures. —Such a radar system may be useful, for example, to persons (e.g., fire, rescue workers, military, police) needing information in situations involving their safety where other sources of information are unavailable or unreliable.

Figure 1:
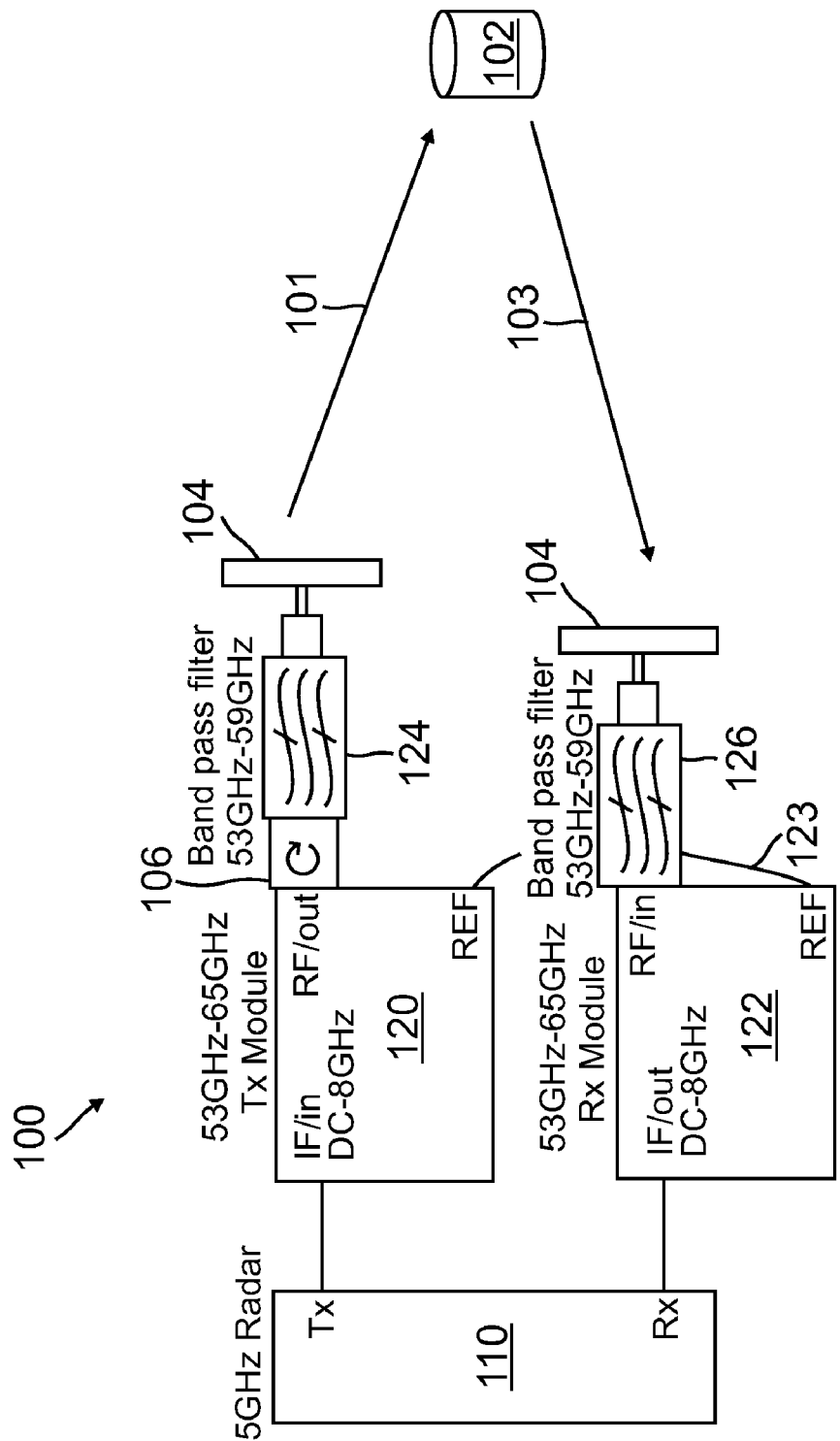
FIG. 1 is a system block diagram illustrating a portable handheld radar system in accordance with one embodiment.

FIG. 1 illustrates a portable handheld radar system 100 in accordance with one or more embodiments. System 100 may emit RF radiation 101 toward a target object 102 in a direction controlled by a user or operator (not shown), for example, by aiming a hand-held unit containing the radar system 100. Further aiming or scanning of RF radiation 101 may also be accomplished by a beam forming array antenna 104. The transmitter of the system 100 may, for example, emit RF radiation 101 in the form of rapid wideband (narrow width) radar pulses at a chosen pulse repetition frequency (PRF) in the V band. The V band pulses can penetrate glass, wood, soil, concrete, dry wall and bricks with varying attenuation constant. By choosing a PRF in the range of 1-10 MHz, for example, and appropriate average transmitter power, a surveillance range of approximately 50-500 feet can generally be achieved. The radar system 100 may, for example, transmit Gaussian pulses as short as 100 pico-seconds wide with center frequency in the V band. Radar system 100 may employ a correlator pulse detector circuit to identify reflections 103 of the radiation 101. Amplitude and delay information may be extracted and processed in an integrated signal processor, for example, included in signal processing and imaging module of UWB radar unit 110. Radar unit 110, which may be a pre-existing, commercially available unit, may provide a display for a user including images for which image construction algorithms may be implemented using digital signal processing (DSP).

Although two antennas 104 are shown in FIG. 1 for clarity of illustration, use of a circulator 106 may enable use of a single antenna 104 for both transmit and receive. Antenna 104 may include a 16-by-1 active array antenna implemented using wafer scale antenna module technology. Wafer scale antenna modules (WSAM) are disclosed by U.S. Patent Application Publication 20090102703, filed Oct. 18, 2007, to Mohamadi et al., and U.S. Patent Publication 20080252546, filed Oct. 31, 2006, to Mohamadi, which are both hereby incorporated by reference.

Radar system 100 may include V band transmit module 120 and receive module 122. Transmit module 120 and receive module 122 each have nominally 60 GHz center frequency, or local oscillator frequency for super-heterodyne frequency conversion, and therefore may also be referred to as "60 GHz" modules as well as "V band" modules. Each of 60 GHz transmit module 120 and 60 GHz receive module 122 may produce or be responsive to frequencies in the range of about 53 GHz to 65 GHz, and may provide a wide band platform for transmission of the UWB spectrum of short impulses at 60 GHz. Transmit module 120 and receive module 122 may be provided with a phase reference 123, as shown in FIG. 1. System 100 may also include band pass filters 124, 126 to select out unneeded sidebands produced by the super-heterodyne frequency conversion.

One operational purpose of system 100 is to provide a link at 60 GHz for transmission and reception of base band (e.g., UWB band) short impulses (as short as 100 pico-seconds) to be used for high precision radar applications. Another purpose of system 100 is to serve as a direct conversion system that modulates a base band short impulse 200 pico-seconds long (producing a spectrum 5 GHz wide) used in a 60 GHz radar front end. System 100 may provide a 60 GHz platform that can be used with an existing 5 GHz UWB radar system that allows the existing 5 GHz UWB system to benefit from the practical size of a directive antenna at 60 GHz. Using the 60 GHz transmit module 120 and receive module 122 in tandem with the existing 5 GHz UWB radar system can provide a virtual narrow beam at 5 GHz which can improve the detection resolution without the need to use antenna arrays with impractical sizes at 5 GHz.

Figure 2:
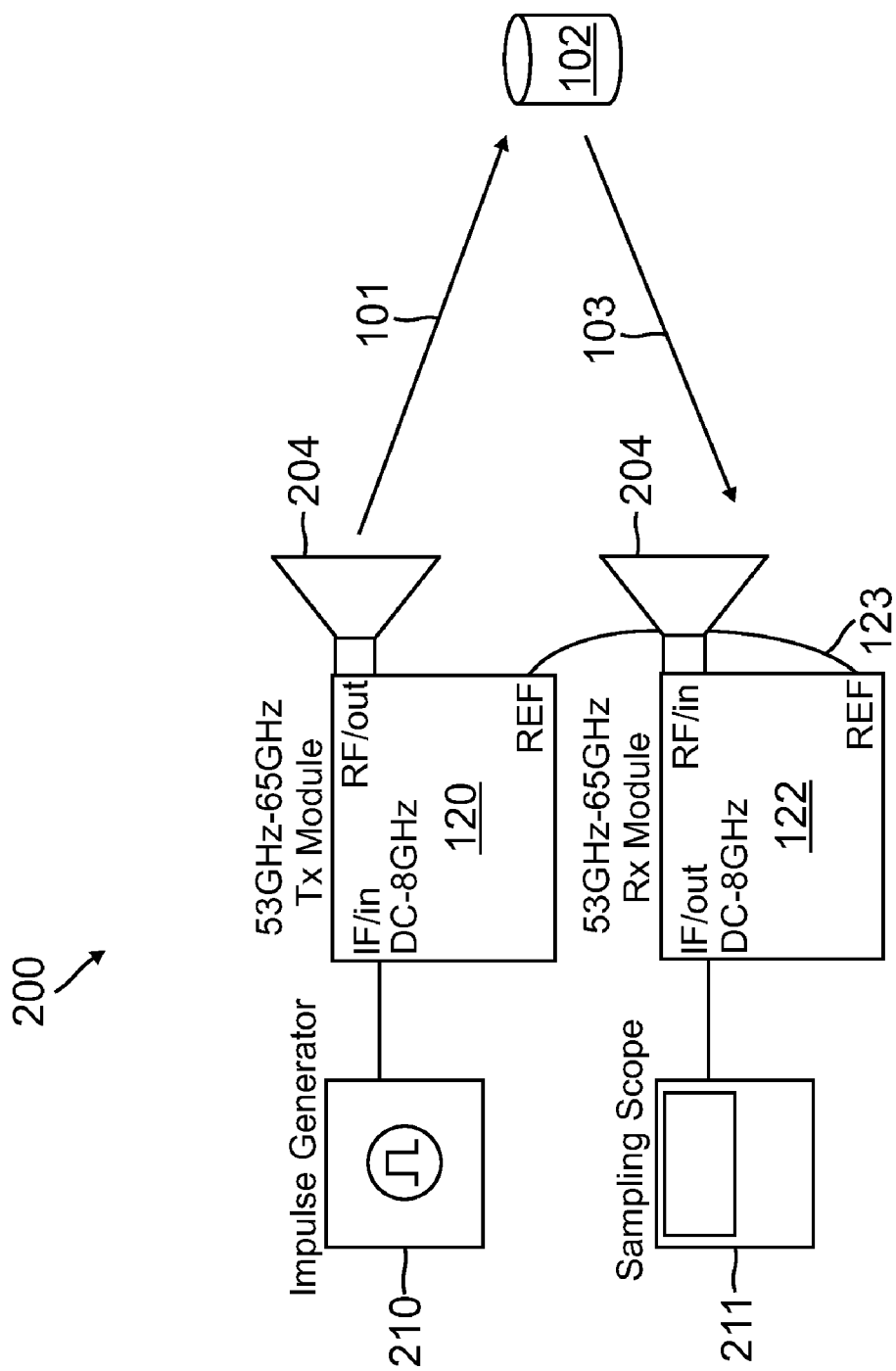
FIG. 2 is a system block diagram illustrating a V-band transmitter and receiver used in a direct conversion setup in accordance with one embodiment.

FIG. 2 is a system block diagram illustrating a V-band transmitter and receiver system 200 used in a direct conversion configuration using the same 60 GHz transmit module 120 and 60 GHz receive module 122. System 200 may include an impulse generator 210 connected to transmit module 120. The impulse from impulse generator 210 is up-converted by transmit module 120, then transmitted and received through the 23 dB, 10 degrees beam width standard horn antennas 204. The received reflections 103 may be down-converted and fed to sampling scope 211.

Figure 3:
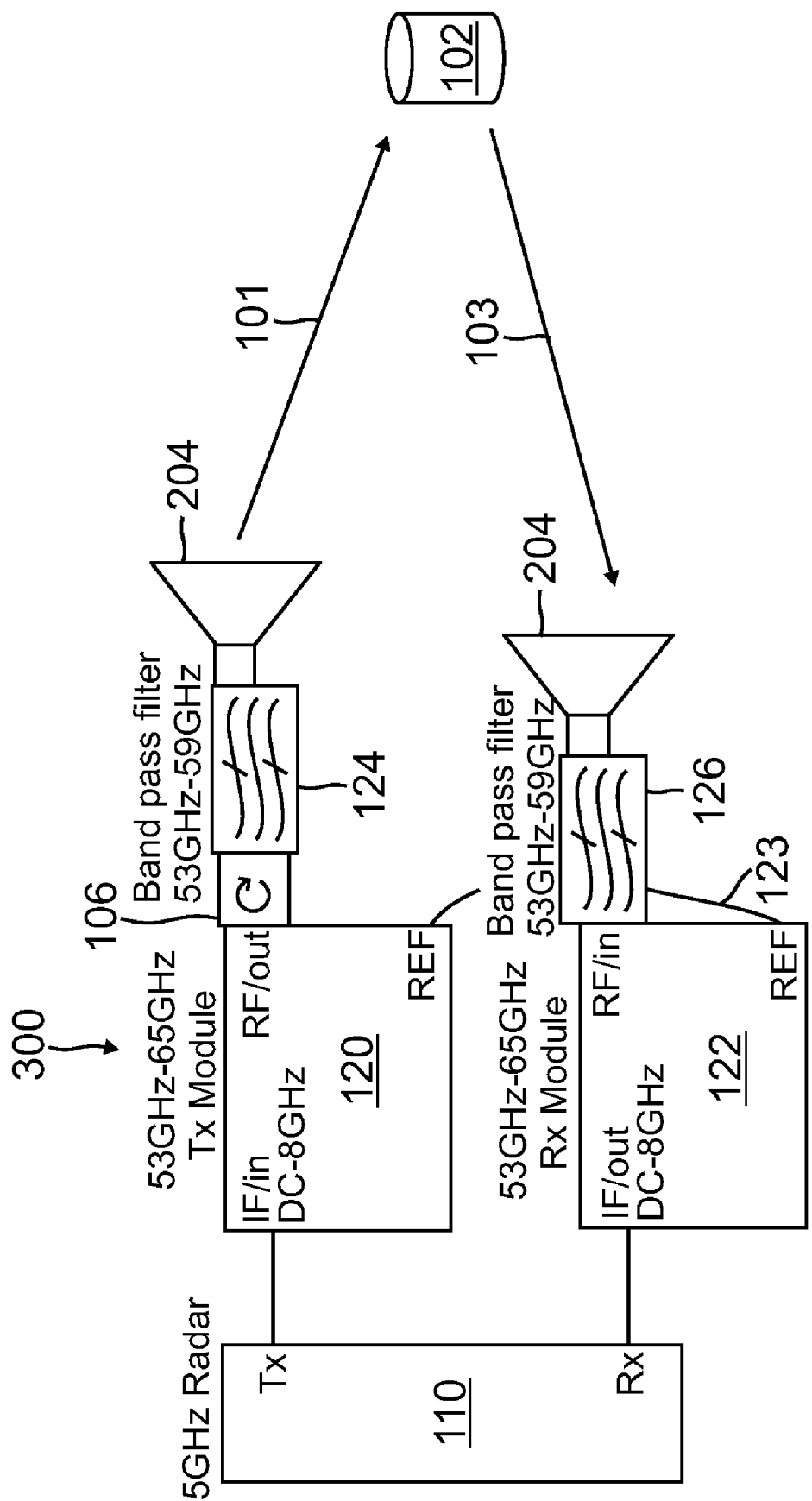
FIG. 3 is a system block diagram illustrating a V-band transmitter and receiver with addition of components to make use of an existing 5 GHz UWB radar in accordance with an embodiment.

FIG. 3 illustrates a V-band transmitter and receiver system 300 with addition of components to system 200 to make use of an existing 5 GHz UWB radar 110 in accordance with an embodiment. As is shown in the block diagram of FIG. 3, with the addition of some external components, e.g., circulator 106 and band pass filters 124, 126, the existing 5 GHz UWB radar 110 can be used alongside the same V band modules 120, 122 of system 200 in a super-heterodyne configuration. To choose the lower side band spectrum, system 300 may use band pass filters (and a circulator 106 at transmit module 120). If desired, the upper side band spectrum could be used instead by choosing different values for the band pass filter components.

Figure 4:
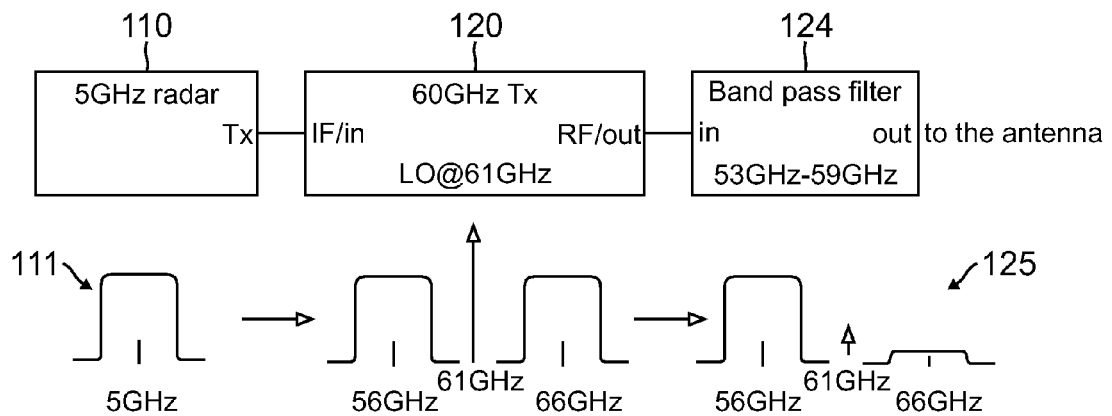
FIG. 4 is a block diagram with corresponding frequency spectrum graphs illustrating transmit operation of a radar system in accordance with an embodiment.
Figure 5:
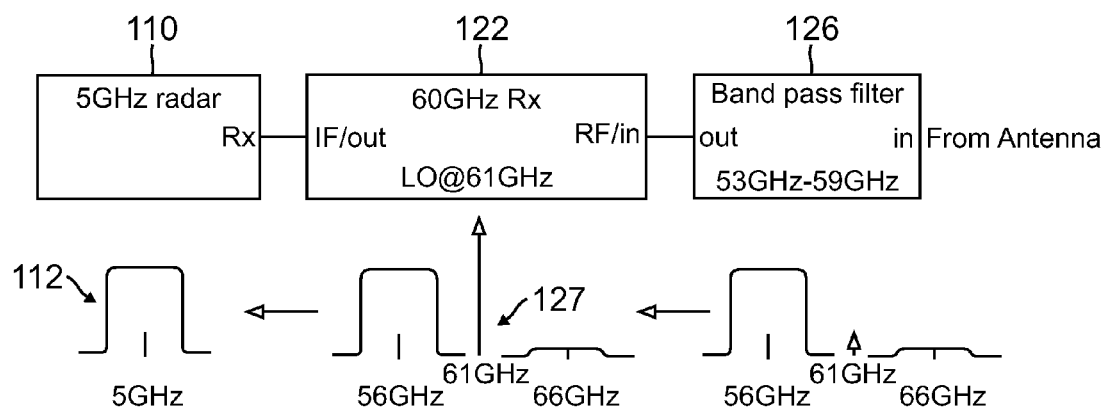
FIG. 5 is a block diagram with corresponding frequency spectrum graphs illustrating receive operation of a radar system in accordance with an embodiment.

FIG. 4 and FIG. 5 are diagrams showing frequency spectrum graphs to illustrate the transmit and receive, respectively, operation of radar systems 100, 200, and 300. As is shown in the block diagram of FIG. 4, and the frequency spectra shown in FIG. 4 and FIG. 5, the 60 GHz front end (e.g., transmit module 120 and receive module 122) is transparent to the 5 GHz radar system 110. In other words, the 5 GHz output 111 and 5 GHz input 112 of radar system 110 may be approximately the same regardless of whether the 60 GHz front end is connected to or being used with radar system 110. FIG. 4 shows the frequency spectrum at the output of each stage of transmit; for example, spectrum 125 shows that a lower side band centered at about 56 GHz has been selected for transmission by the antenna 104 or antenna 204, while an upper side band centered at about 66 GHz has been suppressed. Similarly, FIG. 5 shows the frequency spectrum at the input of each stage in the receive chain; for example, spectrum 127 shows the lower side band amplified while the upper side band is suppressed in this example embodiment, and conversion of the lower sideband via receive module 122 to the baseband spectrum 112.

Another feature of the V band front end (e.g., transmit module 120, receive module 122, and band pass filters 124, 126) which improves the authenticity of the up-converted incident signal 101 and down-converted reflected signal 103 over the original 5 GHz signals from radar unit 110, is the fact that the local oscillator (LO) frequencies at receive module 122 and transmit module 120 are phase locked through the phase reference 123 provided by the transmit module 120 board to the receive module 122.

Figure 6:
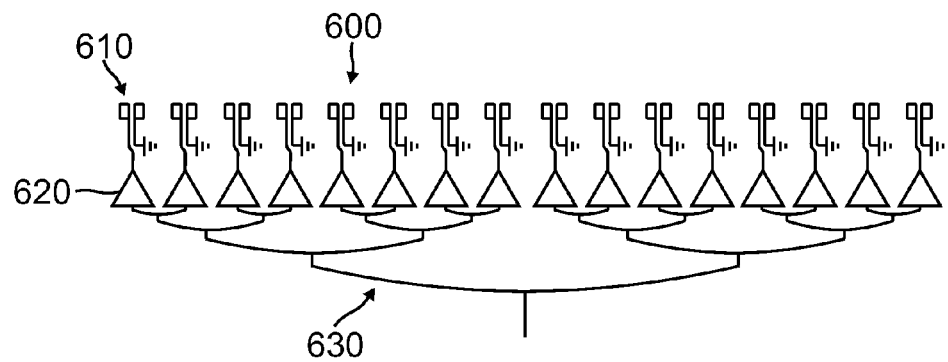
FIG. 6 is a block diagram of a V band 16-by-1 active array antenna of a radar system in accordance with one embodiment.

FIG. 6 is a block diagram illustrating a V band 16-by-1 active antenna array 600, which may be used, for example, to implement active array antenna 104 of radar system 100. The V band 16-by-1 active antenna array 600 is the front-end unit to address the directivity enabler for beam forming within the proposed heterodyne structure. Each element 610 of array 600 has its own dedicated amplifier 620. Corporate combining may be used to implement a corporate distribution feed network 630. The corporate distribution feed network 630 may be symmetrical leading to the in-phase addition of the propagated wave from each element 610. Some nominal values that may be achieved using active antenna array 600 are: antenna array gain=14 dBi (decibels isotropic); antenna gain with reflector=18 dBi; dipole gain=2 dBi; P1 dB=+12 dBm; Gain=21 dB; corporate distribution 1 to 16 insertion loss on RO4035=2 dB; $P_{in}$=4 dBm; $P_{out}$=29 dBm EIRP (without reflector); $P_{out}$=33 dBm EIRP (with reflector).

Figure 7:
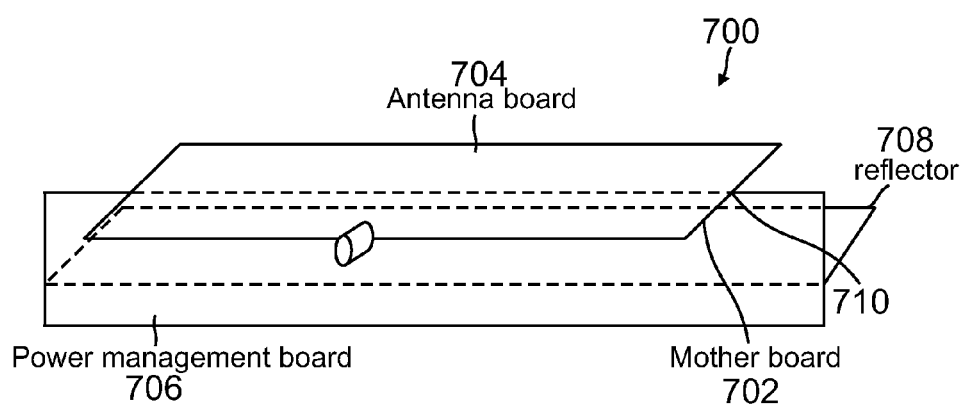
FIG. 7 is a perspective diagram showing a physical arrangement of components for an active antenna array in accordance with one embodiment.

FIG. 7 is a perspective diagram showing a physical arrangement of components for an active antenna array system 700. System 700 may include three separate boards and a reflector: a mother board 702, an antenna board 704, a power management board 706 and the reflector 708. The mother board 702, shown in FIG. 7 and FIG. 8, hosts the MMIC (monolithic microwave integrated circuit) amplifiers 620 and the corporate distribution feed network 630. Antenna board 704 hosts the antenna elements 610. Power management board 706 hosts circuits to provide power management for the MMIC amplifiers. The antenna board 704 may be wire-bonded to the mother board 702 as shown also, for example, in FIG. 8.

Figure 8:
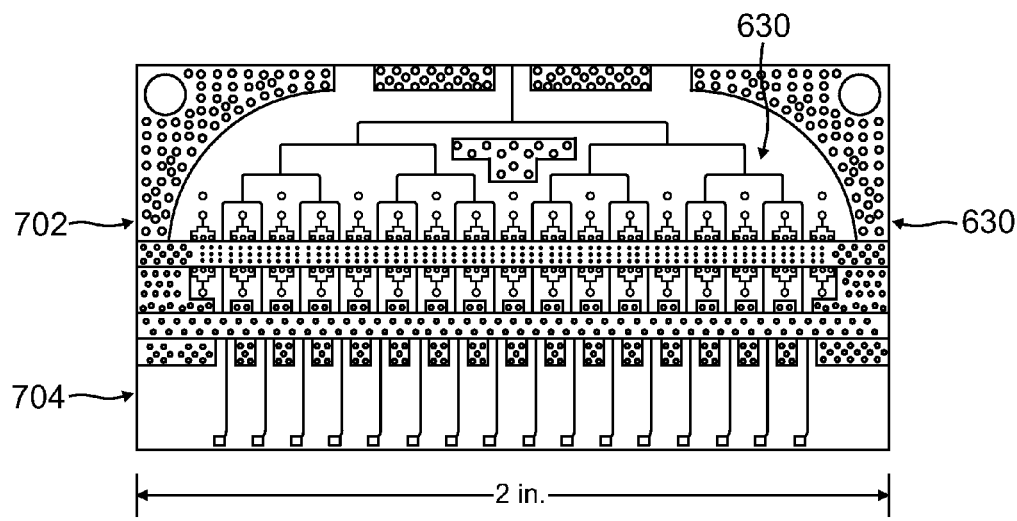
FIG. 8 is a diagram showing a mother board and an antenna board for an antenna array in accordance with one embodiment.

Continuing with FIG. 7 and FIG. 8, in order to maintain the ground plane integrity on the die and the board (e.g., MMIC dies on the mother board 702, and antenna board 704) and also minimize the length of the wire bonds between antenna board 704 and mother board 702, a laser cut trench 710 may be devised on the mother board 702. The trench 710 may house 16 MMIC amplifiers 620 which are die attached to the substrate (e.g., mother board 702) and are fed through the corporate distribution feed network 630. The corporate combining feeds (e.g., network 630) to antenna array 600 are also shown in more detail in FIG. 8. There may be a pedestal devised in mother board 702 on which the antenna board 704 may be installed so that the continuity of the ground plane between the two boards—mother board 702 and antenna board 704—is maintained. The antenna board 704 may be installed on the pedestal using silver epoxy and then the lines connecting the two boards may be wire-bonded so that the antenna array on antenna board 704 is attached to the active distribution network (e.g., network 630) on motherboard 702. As shown in FIG. 8 the maximum dimension, or width, of the antenna array 600 may be less than 2 inches. Active antenna array system 700 may readily be implemented using WSAM methods incorporated by reference above.

Figure 9:
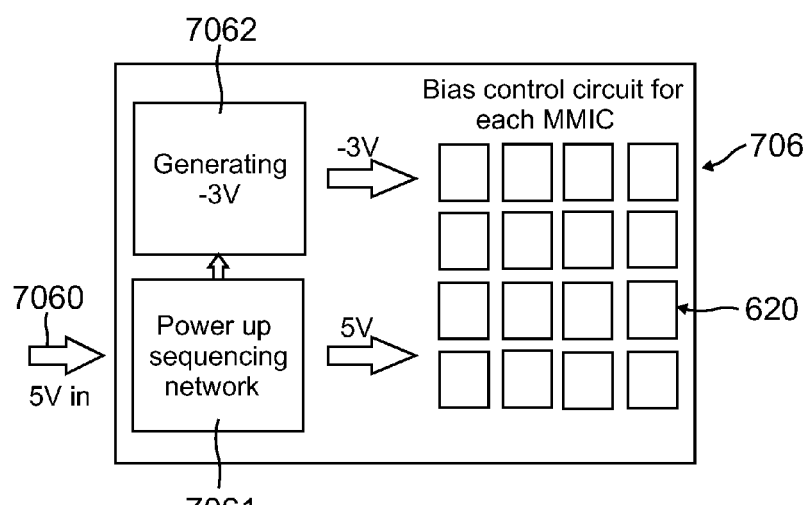
FIG. 9 is block diagram for power management board for an active antenna array in accordance with one embodiment.

FIG. 9 is block diagram for power management board 706 for an active antenna array system 700. Power management board 706 may be powered, for example, by a 5 V (volt) power input 7060. Power management board 706 may provide a sequenced DC bias to the MMIC amplifiers 620 as indicated in FIG. 9 by sequencing module 7061, providing, for example, a 5 V bias sequencing for MMIC amplifiers 620; and sequencing module 7062, providing, for example, a −3 V bias sequencing for MMIC amplifiers 620. As shown in FIG. 7, power management board 706 may be installed perpendicularly to both the motherboard 702 and the reflector 708.

Embodiments described herein illustrate but do not limit the disclosure. It should also be understood that numerous modifications and variations are possible in accordance with the principles of the present disclosure. Accordingly, the scope of the disclosure is best defined only by the following claims.

We claim:

1. A system comprising:
a radar unit having a center frequency in the UWB (ultra wide band) radar band;
a transmit module connected to a radar impulse output of the UWB radar unit, wherein the transmit module produces V band frequencies that are up-converted from the radar impulse output from the radar unit;
an active array antenna connected to the transmit module;
a receive module connected to the active array antenna, wherein:
the receive module produces UWB frequencies that are down-converted from the V band input from the active array antenna; and
a receive input of the UWB radar unit is connected to the receive module; and a band pass filter, wherein:
the band pass filter is connected between the transmit module and the active array antenna;
the transmit module includes a heterodyne converter using a local oscillator at about 61 GHz that up-converts a UWB frequency band centered at 5 GHz to produce frequency sidebands centered approximately at 56 GHz and 66 GHz;
the band pass filter selects a 56 GHz sideband of the up-converted frequencies and passes a band at approximately 53 GHz to 59 GHz to the active array antenna.

2. The system of claim 1, wherein the active array antenna provides beam forming and directionality for V band radiation emitted and received by the active array antenna.

3. The system of claim 1, wherein the active array antenna is sized for V band radar frequencies.

4. The system of claim 1, wherein the active array antenna is less than 2.0 inches wide.

5. A method comprising:
up-converting a UWB frequency pulse from a UWB radar unit to a V band frequency pulse;
transmitting the V band frequency pulse via an active array antenna;
receiving a V band echo pulse via the active array antenna;
down-converting the V band echo pulse from the active array antenna to a UWB pulse;
feeding the UWB pulse to the UWB radar unit for processing by the UWB radar unit;
mixing the UWB pulse with a local oscillator frequency of about 61 GHz in a super-heterodyne converter to up-convert a UWB frequency band centered at 5 GHz to produce frequency sidebands centered approximately at 56 GHz and 66 GHz;
filtering the up-converted pulse to select a 56 GHz sideband of the up-converted frequencies; and
passing an ultra-wideband pulse at approximately 53 GHz to 59 GHz to the active array antenna.

6. The method of claim 5, further comprising:
using the active array antenna to provide beam forming and directionality for V band radiation emitted and received by the active array antenna.

7. The method of claim 6, wherein the active array antenna is sized for frequencies in the range of 50-75 GHz.

8. The method of claim 6, wherein the active array antenna is less than 2.0 inches wide.

9. A device comprising:
an antenna board that defines an antenna plane being the plane of the board and comprising a plurality of antenna elements;
a mother board providing a corporate combining feed to the antenna board; and
a power management board to which the antenna board and mother board are mounted perpendicularly to the antenna plane, wherein:
the antenna elements provide a beam forming antenna for ultra wide band pulses at V band frequencies,
the plurality of antenna elements forms an antenna array; and
the maximum dimension of the antenna array is less than 2 inches.

10. The device of claim 9, further comprising a reflector mounted perpendicularly to the power management board and parallel to the antenna plane.

11. The device of claim 9, wherein the device transmits and receives V band radar pulses.

* * * * *